Dec. 1, 1964  W. E. SPRINGER  3,158,908
CLAMPING LATCH
Filed July 25, 1962  4 Sheets-Sheet 2

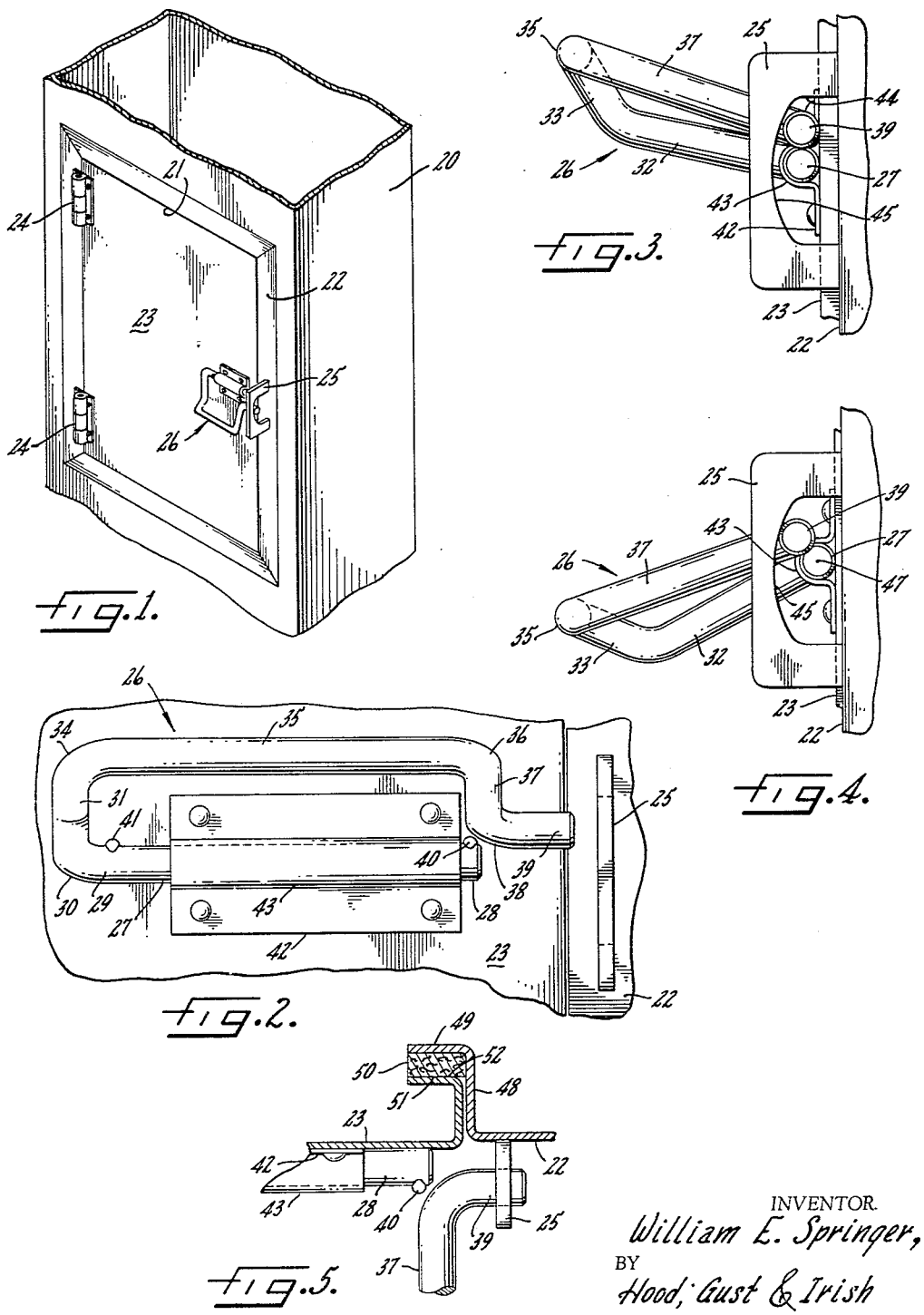

INVENTOR.
William E. Springer,
BY
Hood, Gust & Irish
Attorneys.

Dec. 1, 1964  W. E. SPRINGER  3,158,908
CLAMPING LATCH
Filed July 25, 1962  4 Sheets-Sheet 3
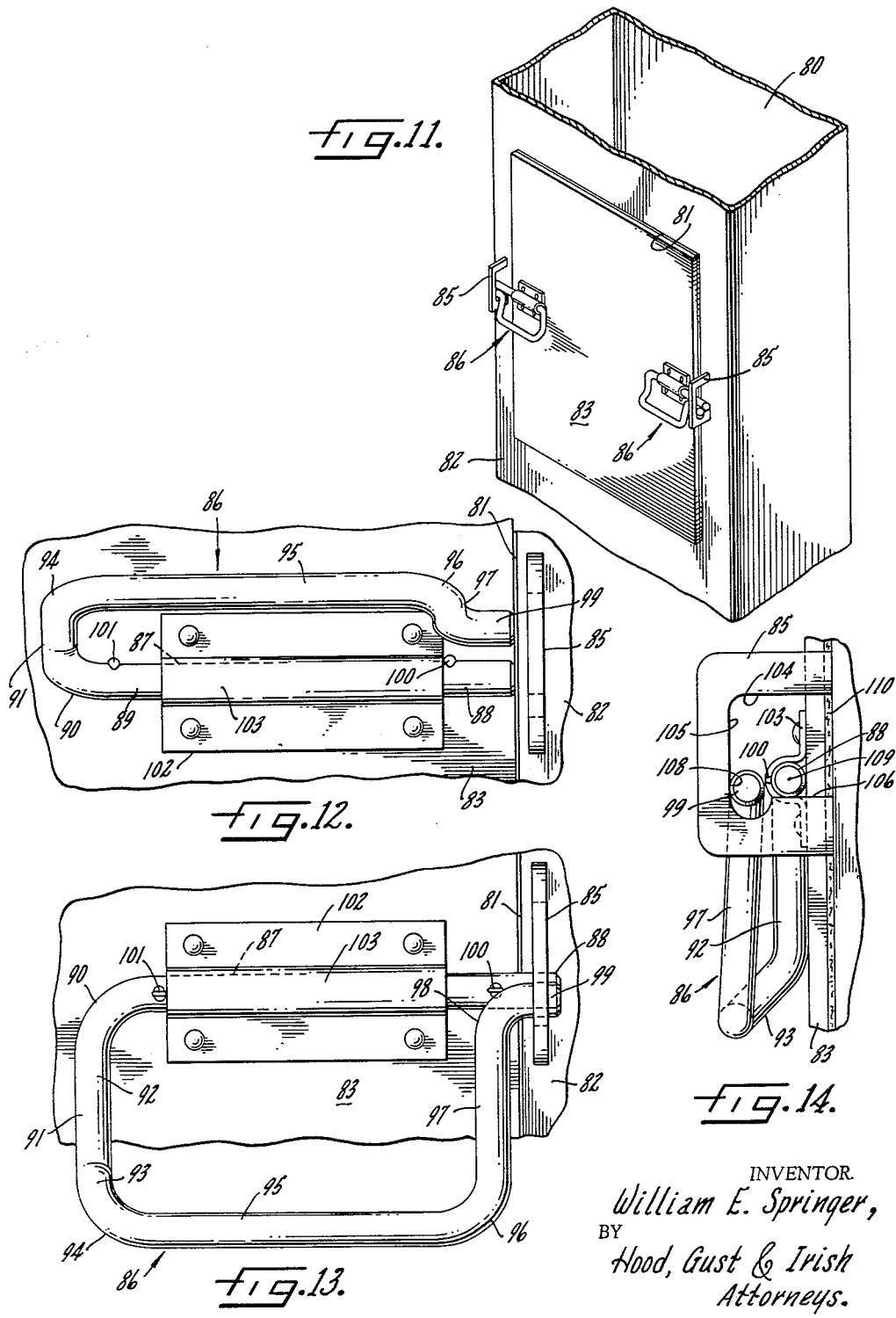
INVENTOR.
William E. Springer,
BY
Hood, Gust & Irish
Attorneys.

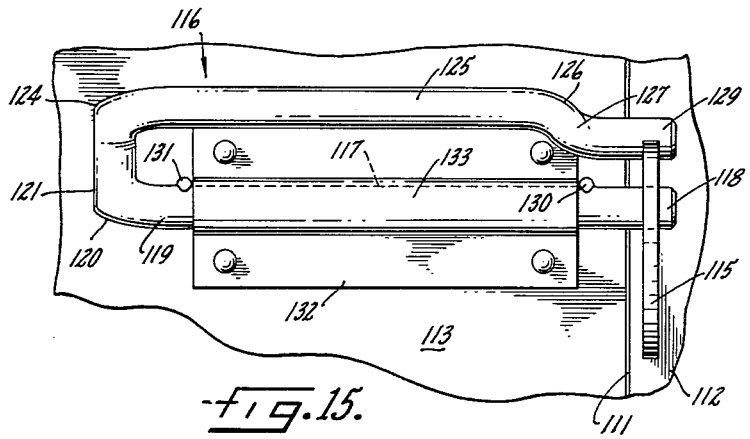
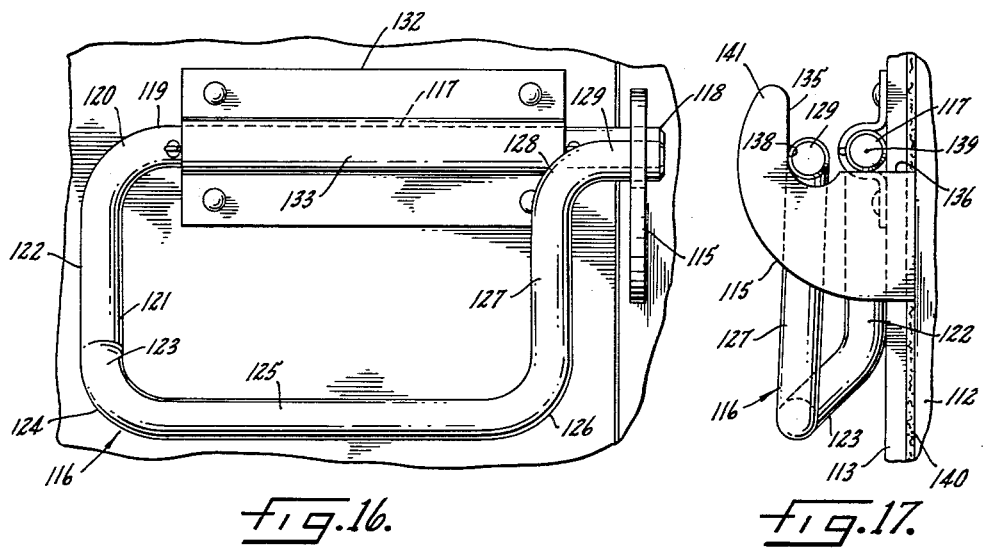

United States Patent Office 3,158,908
Patented Dec. 1, 1964

3,158,908
CLAMPING LATCH
William E. Springer, Springfield, Ohio, assignor to
Robbins & Myers, Inc., Springfield, Ohio, a corporation of Ohio
Filed July 25, 1962, Ser. No. 212,277
4 Claims. (Cl. 20—16)

The present invention relates to a clamping latch of such construction as to apply a resilient force to a panel, cover, door, drawer panel or the like to retain the same in sealing association with a port in a wall.

In many environments, it is desirable to provide airtight, liquid-tight and/or dust-tight closure means for an opening in a chamber, duct, cabinet or the like. Particularly, plenum chambers in air cleaning equipment must often be provided with access openings which are customarily closed by means of hinged doors or by means of removable panels, seating against gasket means perimetrally surrounding, or partially surrounding, such openings; and the latching means for securing such closures in sealing relationship must preferably be of such character as to exert a force upon the closure element in a closing direction and to maintain that force in spite of shock, vibration or other casual mechanical disturbance.

A primary object of the present invention, then, is to provide latch means which shall be simple, inexpensive and sturdy but which, in use, will exert and maintain a resilient closing force upon the closure element with which it is associated.

A further object of the invention is to provide latching means which is extremely simple not only in construction but also in operation, which is inherently resilient and which, in its holding position, will be in an over-center condition whereby its inherent resiliency resists casual dislodgment of the latching means from such holding position.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is a fragmentary, perspective view illustrating one form of my improved clamping latch in holding condition to retain a hinged door in sealing relation to an opening in a wall of, for instance, a plenum chamber;

FIG. 2 is a front elevation, to an enlarged scale, showing the latch mechanism of FIG. 1 in released and withdrawn position;

FIG. 3 is an end elevation of the latching mechanism, viewed from the right of FIG. 2;

FIG. 4 is a view similar to FIG. 3, but showing the parts in an intermediate condition;

FIG. 5 is a fragmentary, horizontal section showing portions of the wall and of the closure element, with portions of the latching mechanism in the intermediate position of FIG. 4;

FIG. 11 is a view similar to FIG. 1 but showing a removable closure panel held in place by still another form of latch mechanism;

FIG. 12 is a front elevation similar to FIG. 2, but illustrating the last-mentioned form of latch mechanism in retracted, released condition;

FIG. 13 is a view similar to FIG. 12 but showing the latch element in projected, clamping position;

FIG. 14 is an end elevation viewed from the right of FIG. 13;

FIG. 15 is a view similar to FIG. 12 but showing a modified form of catch and a modified mounting for the latch element;

FIG. 16 is a front elevation of the mechanism illustrated in FIG. 15 but showing the latch element in clamping position; and FIG. 17 is an end elevation taken from the right of FIG. 16.

Figure 6:
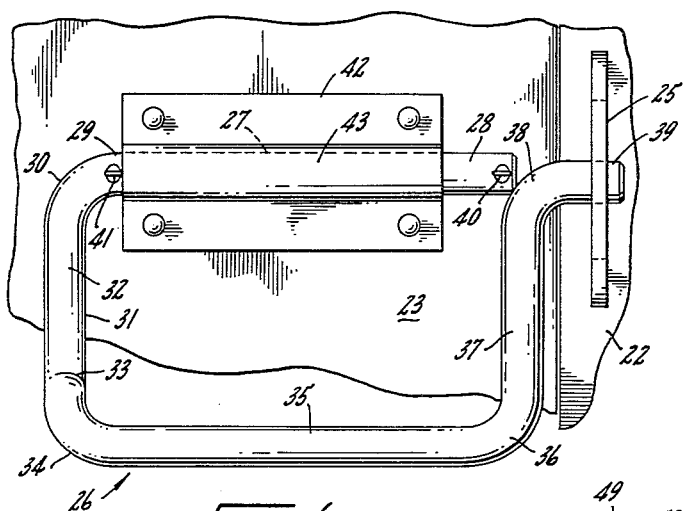
FIG. 6 is a front elevation, showing the latch element in projected, clamping position.

Referring more particularly to the drawings, and specifically to FIGS. 1 to 8 thereof, it will be seen that I have illustrated a chamber, duct or container 20 formed in one wall with a port or opening 21 which is surrounded by a frame 22. A door 23 is mounted at one edge upon hinges 24 for movement into and out of closing association with the port 21.

A catch 25 is fixedly supported from the frame 22 adjacent that edge of the opening 21 which is remote from the hinges 24, a latch element indicated generally by the reference numeral 26 is mounted upon that edge of the door which is remote from the hinges 24.

Preferably, the latch element 26 is formed from a single bar or tube of torque-resilient material such as, for instance, steel. Said bar is formed to provide a leg 27, opposite end portions 28 and 29 of which are disposed upon a common axis. As shown, the leg 27 is rectilinear, but as the description proceeds, it will be apparent that the region between the end portions 28 and 29 need not necessarily be disposed entirely upon the common axis.

Figure 7:
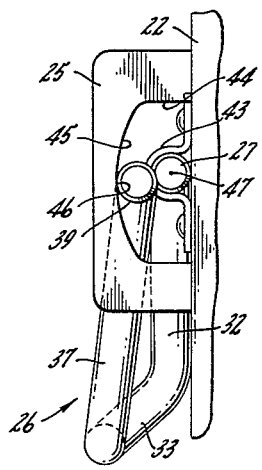
FIG. 7 is an end elevation of the parts as viewed from the right of FIG. 6.
Figure 8:
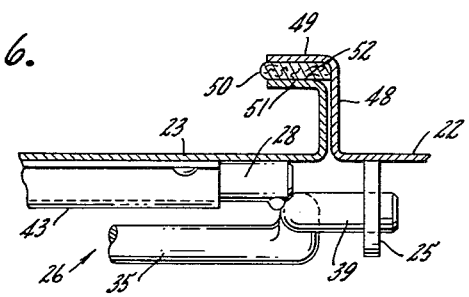
FIG. 8 is a fragmentary, horizontal section showing the latch element in the position of FIGS. 6 and 7.

The latch element 26 is bent, as at 30, to define an arm 31 extending substantially radially from the leg 27, the axis of the proximal region 32 being disposed in a plane which includes the axis of the leg 27, and the distal region 33 of the arm 31 being bent or turned out of that common plane, as is most clearly to be seen in FIGS. 3, 4 and 7.

At the distal extremity of the region 33 of the arm 31, the latch element is again bent as at 34 to define a base 35 which extends, in parallelism with the leg 27, toward the end portion 28 of said leg, and the latch element is again bent as at 36 to define a second arm 37 which extends toward the leg 27 but which is slightly shorter than the arm 31. At 38, the latch element is again bent to define a bolt 39 which extends, in parallelism with the axis of the leg 27, away from both of the arms 31 and 37, beyond the extremity of the leg end portion 28, the axis of the bolt 39 being offset from the axis of the leg 27 in approximately the same direction in which the distal region 33 of the arm 31 is turned. Thus, the bolt 39 is disposed in offset parallelism with respect to the leg 27.

Suitable stop means 40 and 41 are formed on or carried by the leg 27 for a purpose which will appear. A bracket 42, formed with a part-tubular offset 43, is suitably affixed to the outer surface of the door 23, whereby the offset 43 cooperates with said door surface to define a rectilinear tunnel in which the leg 27 is confined for reciprocation and oscillation about its own axis, the stop means 40 and 41 limiting the degree of reciprocation of the latch element 26 relative to the door 23. It will be apparent that the arm 31, arm 37 and base 35 define a bight which is bodily oscillable about the axis of the leg 27, whereby the bolt 39 will be moved through an arc centered upon the axis 47 of the leg 27.

The catch 25 is formed with a port 44 therethrough, the perimetral boundaries of said port being disposed substantially in a plane perpendicular to the frame 22. Said port is formed to define an abutment surface 45 which is an arc drawn upon a radius greater than the radius of the arc of movement of the bolt 39.

From a consideration of FIGS. 3, 4 and 7, it will be apparent that, as the latch element 26 is moved from the position of FIG. 3 through the position of FIG. 4 to the position of FIG. 7, that point on the surface of the bolt 39 which is most remote from the panel 23, measured in a direction perpendicular to the chamber wall, will engage the face 45 of the catch 25 and will act against said face to force the panel edge inwardly relative to the chamber wall. It is particularly to be noted that the point of engagement of the bolt 39 with the face 45 will move through the line which is perpendicular to the wall and includes the axis 47 of the leg 27 before the arm 31 comes into flat engagement with the surface of the panel 23. As shown, the mid-point 46 of the arcuate face 45 is disposed below that line and thus is engaged by the surface of the bolt 39 when the latch element is in the position of FIGS. 6 and 7.

The parts are so proportioned and designed that, as the bolt 39 moves from the position of FIG. 4 to the position of FIG. 7, it will be forced, by its engagement with the face 45, toward the surface of the panel 23, thus torsionally flexing the base 35 of said latch element. In the condition illustrated in FIGS. 6 and 7, therefore, the latch element 26 is under resilient flexure. Since the face 45 begins to curve toward the panel 23 above the point 46, and since the arc of movement of the bolt 39 about the axis 47 of the leg tends outwardly as the latch is moved in a clockwise direction from the position of FIG. 7, the degree of flexure of the latch element must be increased during the first few degrees of clockwise movement of the latch from its position of FIG. 7.

In the form of assembly illustrated in FIGS. 1 to 8, the frame includes a rearwardly extending web 48 terminating in an inturned flange 49 which carries, on its outwardly-presented face, compressible gasket material 50. The parts are so proportioned and designed that, when the rearwardly presented surface 52 of the panel 23 just engages the exposed face 51 of the gasket means 50, the latch element 26 may be projected, from its position illustrated in FIG. 2, to move the bolt 39 into the port 44 formed in the catch 25; and, as the latch element is turned from its position of FIG. 3 to its position of FIG. 4, the bolt 39 will engage the face 45 at a point significantly above the horizontal plane including the axis 47 of the leg 27. Now, as the latch element is turned from its position of FIG. 4 to its position of FIG. 7, the panel 23 will be moved from the position of FIG. 5 to the position of FIG. 8, compressing the gasket means 50 in the manner clearly illustrated. This action is achieved because the maximum distance of that point on the surface of the bolt which is most remote from the inner surface 52 of the panel, when the latch means is in clamping position, is greater than the perpendicular distance from the median point 46 of the catch face 45 to the exposed face 51 of the gasket means when the gasket means is in equilibrium condition.

Thus, with the parts in the positions of FIGS. 2 and 3, the door 23 may be swung until the surface 52 lightly engages the surface 51. Then the latch element 26 may be shifted longitudinally toward the right as viewed in FIG. 2 to enter the bolt 39 through the opening 44 of the catch 25. Now, as the latch element is swung from the position of FIG. 3 through the position of FIG. 4, to the position of FIG. 7, the door 23 will be forced toward the right as viewed in FIGS. 3, 4 and 7, into substantially flush relation with the frame 22, the gasket means 50 will be compressed and the base portion 35 of the latch element 26 will be torsionally flexed to maintain resilient closing pressure upon the door. In the position of FIG. 7, the bolt 39 is in an "over-center" relation which will resiliently hold the latch element in the position of FIG. 7, with the proximal portion 32 of the arm 31 pressed against the outer surface of the door 23, against any accidental dislodgement.

Figure 9:
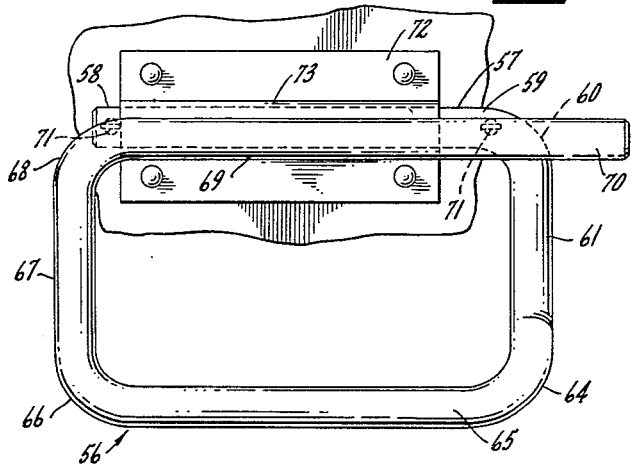
FIG. 9 is a front elevation of a modified form of latch element mounted on a panel.
Figure 10:
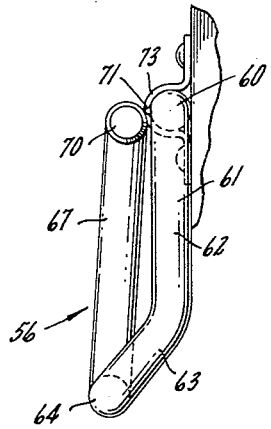
FIG. 10 is an end elevation of the latch element shown in FIG. 9.

In FIGS. 9 and 10, I have shown a still simpler form of latch element 56 which, however, will attain most of the operational advantages of the latch element 26. The element 56 comprises a leg 57 whose opposite end portions 58 and 59 are disposed upon a common axis. Said latch element is bent as at 60 to provide an arm 61 extending substantially radially therefrom, the proximal portion 62 of said arm having its axis disposed in a common plane with the axis of the leg portions 58 and 59, and the distal portion 63 of said arm being turned out of that common plane. The latch element is further bent as at 64 to define a base 65 disposed in substantial parallelism with the leg 57, and is again bent as at 66 to define a second arm 67 which extends toward the end 58 of the leg 57, but is somewhat shorter than the arm 61. The latch element is again bent at 68 to define a bolt 69 which extends in offset parallelism with the leg 57 past the arm 61, the terminal portion 70 of said bolt being adapted for cooperation with catch means similar to the catch 25. The latch element 56 may be supported upon a door or panel through the medium of a bracket 72 similar to the bracket 42 and formed with an offset 73 which, with the panel, defines a tunnel in which the intermediate portion of the leg 57 may be mounted for oscillation about its own axis. Stop means 71, 71 may be provided on the leg 57 to limit the degree to which the leg 57 may be reciprocated relative to the bracket 72. The terminal end portion 70 of the bolt 69 will cooperate with the catch in a manner which is, to all intents and purposes, equivalent to the mode of cooperation of the bolt 39 with the catch 25, although the torsional flexure in this case will occur primarily in the arm 67.

In FIG. 11, I have shown a chamber 80 formed with a port or opening 81 in one wall 82, adapted to be closed by a removable panel 83. In this form of the invention, the port is shown without a frame equivalent to the frame 22.

Adjacent each lateral edge of the port 81, one or more catches 85 will be fixedly secured to the wall 82; and a latch element, indicated generally by the reference numeral 86, is mounted upon the panel 83 for cooperative association with each such catch.

As shown, each latch element 86 is formed to provide a leg 87, opposite end portions 88 and 89 of which are disposed upon a common axis. The latch element is bent as at 90 to define an arm 91 whose proximal region 92 extends substantially radially from the leg 87 and has its axis disposed in a common plane with the axis of said leg. The distal region 93 of said arm is turned out of that common plane. The latch element is bent again at 94 to define a base 95 which is substantially parallel with, but shorter than, the leg 87; and it is bent again at 96 to define a second arm 97 extending toward the end portion 88 of the leg 87. The arm 97 is somewhat shorter than the arm 91, and it is bent at 98 to define a bolt 99 which extends in offset parallelism with the leg 87, its terminus being substantially flush with the terminus of the leg end portion 88. Stop means 100 and 101 limit the reciprocation of the leg 87 relative to the bracket 102 which is formed with an offset 103 and is secured to the panel 83 whereby said offset defines with said panel a tunnel in which the leg 87 is mounted for limited oscillation and reciprocation. The parts are so proportioned and designed that, when the latch element 86 is in its retracted position of FIG. 12, the termini of the leg portion 88 and the bolt 99 are substantially flush with the adjacent edge of the panel 83.

The catch 85 is formed with an opening 104 therein, the boundaries of which lie substantially in a plane perpendicular to the wall 82. Said opening provides an upwardly presented supporting surface 106 and a substantially vertical camming surface 105. The catch 85 is so positioned that, when the panel 83 is located in closing relation to the port 81, the latch element 86 may be shifted to its projected position, as illustrated in FIG. 13, whereby the leg end portion 88 will be located in supported relation upon the surface 106 and the bolt 99 will penetrate the opening 104. The surface 105 is presented toward, and spaced from, the wall 82 which may preferably be provided with a layer 110 of gasket material surrounding the port 81. The distance between the face 105 and the exposed surface of the gasket material 110, however, is somewhat less than the maximum distance from that face of the gasket material which may be attained by the remote surface of the bolt 99, when the gasket material is in equilibrium condition. Consequently, as the latch element is turned from the position of FIG. 12 to the position of FIGS. 13 and 14, the bolt surface will engage the face 105, the base portion 95 of the latch element will be torsionally flexed and the gasket material will be resiliently compressed, as above explained. The latch is so proportioned and designed that, as the proximal portion 92 of the arm 91 moves into flat engagement with the surface of the panel 83, the bolt 99 will traverse the horizontal plane including the axis 109 of the leg 87 and will come into engagement with a point 108 on the face 105 below that plane. Thus, it will be seen that, in the position of FIGS. 13 and 14, the bolt 99 occupies an "over-center" relation which will resiliently hold the latch element against casual dislodgment from its clamping position.

The assembly of FIGS. 15, 16 and 17 is similar to the assembly of FIGS. 12, 13 and 14. Again, the wall 112 is formed with a port 111 adapted to be closed by a removable panel 113. One or more catch elements 115 are fixedly mounted upon said wall adjacent each lateral edge of the port 111, and a latch element 116 is suitably supported upon the panel 113 for cooperation with each such catch. The latch element 116 comprises a leg 117 whose opposite ends 118 and 119 are disposed upon a common axis. Said latch element is bent as at 120 to define an arm 121 the proximal region 122 of which is substantially radial with respect to the leg 117 and has its axis disposed in a plane common to the axis of the leg 117. The distal region 123 of the arm 121 is turned out of said common plane; and the latch element is bent again as at 124 to define a base 125 spaced from but substantially parallel with the leg 117. The latch element is bent again at 126 to define a second arm 127 which is somewhat shorter than the arm 121 and which is bent at 128 to define a bolt 129. The leg 117 is provided with stop means 130, 131 holding said leg against reciprocation relative to a bracket 132 which, being formed with an offset 133, is secured to the panel 113 and cooperates with said panel to define a tunnel in which the leg 117 is mounted for oscillation about its own axis.

The catch 115 is formed to provide an upwardly-presented supporting surface 136 and a substantially vertical surface 135 which is spaced from, and presented toward, the wall 112, said catch being upwardly open. The latch member 116 is so proportioned and designed that the leg end 118 and the bolt 129 project beyond the adjacent edge of the panel. With the latch element in the position of FIG. 15, the panel may be moved into closing relation with the port 111, with the leg end above the upper end of the catch toe 141, and the panel may then be moved downwardly until the leg end 118 comes to rest upon the surface 136. Now, if the latch element is turned from the position of FIG. 15 to the position of FIGS. 16 and 17, the bolt 129 will engage the face 135, as it moves about the axis 139 of the leg end 118, to press the panel resiliently into compressing engagement with the gasket means 140, quite in the manner above described. The parts are so proportioned and designed that, as the proximal region 122 of the arm 121 moves into flat engagement with the panel 113, the bolt 129 will traverse the horizontal plane including the axis 139 of the leg 117, so that the bolt 129 will engage a point 138 on the face 135 below that horizontal plane and the latch will be resiliently held against casual dislodgement.

I claim as my invention:

1. In combination with a wall having a port therein and a panel adapted to close said port, securing means comprising a catch fixed with respect to said wall and providing a face rigidly spaced from and presented toward said wall, a latch element comprising a loop formed to provide a leg portion, a bight portion and a bolt portion, the axis of said bolt portion being located in offset parallelism with the axis of said leg portion, means securing said latch element leg portion to said panel for oscillation about its own axis whereby said bolt portion will be bodily moved through an arc variably spaced from said panel about said leg portion axis, that surface of said bolt portion most remote from said panel, measured on a line perpendicular to said wall when said panel is in closing relation to said port, being engageable with said catch face and the point of maximum distance of said surface from said wall, as said bolt portion so moves, being at least equal to the maximum spacing of said face from said wall, the equilibrium distance between said axes exceeding the distance between said wall and said catch face reduced by the sum of the diameters of said leg portion and said bolt portion.

2. The combination with a panel for closing an opening in a wall, of clamping latch means comprising a bracket secured to a surface of said panel and formed to provide a tunnel of arcuate cross section opening at one side to said panel surface, a latch element comprising a leg confined by said panel surface within said tunnel for oscillation upon the axis of said tunnel, an arm extending substantially radially from said leg at one end of said leg, the distal end region of said arm being turned out of the plane common to the axes of said leg and said arm so that, when the proximal region of said arm lies in contact with said panel surface, said distal region inclines away from said panel surface, a base portion extending from the distal end of said arm in substantial parallelism with said leg toward the other end of said leg, a second arm extending from said base portion toward said leg, said second arm being shorter than said first arm and terminating in a bolt portion extending in offset parallelism with said leg in the direction of the other end of said leg, and catch means fixed relative to said wall and providing an abutment face spaced from and presented toward said wall and engageable by said bolt portion of said latch element.

3. The combination with a panel for closing an opening in a vertical wall, of catch means supported from said wall adjacent each lateral edge of said opening, each such catch means being formed to provide an upwardly-presented supported surface and a generally vertical face spaced from and presented toward said wall, and clamping latch means for each catch means, each such latch means comprising a bracket secured to a surface of said panel means adjacent a lateral edge thereof and formed to provide a tunnel of arcuate cross section opening at one side to said panel surface, a latch element comprising a leg confined by said panel surface within said tunnel for oscillation upon the axis of said tunnel, an arm extending substantially radially from said leg at one end of said leg, the distal end region of said arm being turned out of the plane common to the axes of said leg and said arm so that, when the proximal region of said arm lies in contact with said panel surface, said distal region inclines away from said panel surface, a base portion extending from the distal end of said arm in substantial parallelism with said leg toward the other end of said leg, a second arm extending from said base portion toward said leg, said second arm being shorter than said first arm and terminating in a bolt portion extending in offset parallelism with said leg in the direction of the other end of said leg, said other end of said leg extending beyond said panel edge for supporting engagement upon the supporting surface of the adjacent catch means and said bolt portion likewise extending beyond said panel edge for engagement with said vertical face of the adjacent catch means.

4. The combination with a panel for closing an opening in a vertical wall, of catch means supported from said wall adjacent each lateral edge of said opening, each such catch means being formed to provide a circumferentially-closed port whose boundaries lie substantially in a plane perpendicular to said wall, the boundaries of said port providing an upwardly-presented supporting surface and a generally vertical face spaced from and presented toward said wall, and clamping latch means for each catch means, each such latch means comprising a bracket secured to a surface of said panel means adjacent a lateral edge thereof and formed to provide a tunnel of arcuate cross section opening at one side to said panel surface, a latch element comprising a leg confined by said panel surface within said tunnel for oscillation upon the axis of said tunnel and for limited axial reciprocation relative to said tunnel, an arm extending substantially radially from said leg at one end of said leg, the distal end region of said arm being turned out of the plane common to the axes of said leg and said arm so that, when the proximal region of said arm lies in contact with said panel surface, said distal region inclines away from said panel surface, a base portion extending from the distal end of said arm in substantial parallelism with said leg toward the other end of said leg, a second arm extending from said base portion toward said leg, said second arm being shorter than said first arm and terminating in a bolt portion extending in offset parallelism with said leg in the direction of the other end of said leg, said leg being reciprocable between a retracted position in which its said other end is substantially flush with the adjacent panel edge and a projected position in which its said other end extends beyond said panel edge for supporting engagement upon the supporting surface of the adjacent catch means and in which said bolt portion likewise extends beyond said panel edge for engagement with said vertical face of the adjacent catch means.

References Cited by the Examiner

UNITED STATES PATENTS

| | | | |
|---|---|---|---|
| 1,385,889 | 7/21 | Roberts | 292—241 X |
| 1,551,566 | 9/25 | Jaeb | 292—241 X |
| 1,782,845 | 11/30 | Fildes | 292—26 X |
| 2,526,276 | 10/50 | Robinson | 292—240 X |
| 2,715,540 | 8/55 | Potter | 292—241 |

HARRISON R. MOSELEY, *Primary Examiner.*